United States Patent [19]

Hütter et al.

[11] Patent Number: 4,867,055

[45] Date of Patent: Sep. 19, 1989

[54] GUARD FOR THE NIPS OF ROLLS IN CALENDERS

[75] Inventors: Egon Hütter, Kempen; Gerhard Hartwich, Krefeld, both of Fed. Rep. of Germany

[73] Assignee: Kleinewefers GmbH, Krefeld, Fed. Rep. of Germany

[21] Appl. No.: 205,082

[22] Filed: Jun. 9, 1988

[30] Foreign Application Priority Data

Jun. 10, 1987 [DE] Fed. Rep. of Germany ....... 3719305

[51] Int. Cl.$^4$ ............................ B29B 3/04; F16P 1/00
[52] U.S. Cl. ...................................... 100/173; 74/612;
74/616; 226/181; 264/175; 425/151; 425/194;
425/363; 493/421
[58] Field of Search ............... 425/142, 154, 163, 194,
425/224, 226–230, 363, 367, 371, 374, 151, 168,
DIG. 235; 264/175, 280–284, DIG. 68; 100/53,
155, 157, 161–164, 173–176; 68/264, 265, 267,
268; 242/76, 1, 55, 65, 67.1 R; 162/272;
74/609–612, 616; 493/38, 421; 226/181, 186, 187

[56] References Cited

U.S. PATENT DOCUMENTS

| | | | |
|---|---|---|---|
| 2,620,320 | 12/1952 | Novak et al. ........................ | 264/175 |
| 2,651,076 | 9/1953 | Hornbostel ......................... | 425/224 |
| 3,256,395 | 6/1966 | Grau et al. .......................... | 100/53 |
| 3,293,941 | 12/1966 | Schwabe, Jr. ........................ | 100/53 |
| 3,498,217 | 3/1970 | Kletti ..................................... | 74/612 |
| 3,654,821 | 4/1972 | Mikulin ................................ | 100/53 |
| 3,665,846 | 5/1972 | Schlunke ............................. | 68/264 |
| 3,698,527 | 10/1972 | Wiggers ............................... | 100/53 |
| 3,978,701 | 9/1976 | Rhodes ................................. | 74/612 |
| 4,043,731 | 8/1977 | Kratzmann et al. ....... | 425/DIG. 235 |
| 4,117,054 | 9/1978 | Salo ....................................... | 264/175 |
| 4,282,963 | 8/1981 | Kafura et al. ........................ | 74/612 |
| 4,306,439 | 12/1981 | Miller ................................... | 74/612 |

FOREIGN PATENT DOCUMENTS

| | | |
|---|---|---|
| 1987469 | 6/1968 | Fed. Rep. of Germany . |
| 2439797 | 3/1976 | Fed. Rep. of Germany ... 425/DIG. 235 |
| 616485 | 7/1978 | U.S.S.R. ................................ 100/53 |

Primary Examiner—Jan H. Silbaugh
Assistant Examiner—Mathieu Vargot
Attorney, Agent, or Firm—Peter K. Kontler

[57] ABSTRACT

A guard at the inlet side of the nip of two rolls in a calender or a like machine has an elongated support which is mounted in the machine frame for movement toward and away from the rolls at the inlet side of the nip. The support carries two elongated strips each of which is adjacent one of the rolls and has several sections. The support carries discrete moving mechanisms for the sections of each strip regardless of whether the sections are discrete sections or such sections form parts of a one-piece strip. This renders it possible to select and alter the width of the entire clearance between each strip and the periphery of the respective roll regardless of eventual deformation of the support and/or of the rolls.

16 Claims, 2 Drawing Sheets

GUARD FOR THE NIPS OF ROLLS IN CALENDERS

BACKGROUND OF THE INVENTION

The invention relates to improvements in calenders and analogous machines for treating running webs of paper, textile material and the like. More particularly, the invention relates to improvements in guards for the inlet sides of nips of the rolls in such machines. Still more particularly, the invention relates to improvements in guards of the type wherein a support which extends longitudinally of the nip of two rolls carries two strip-shaped blocking devices (hereinafter called strips for short) each of which is adjacent one of the rolls and which flank the inlet side of the nip to thus protect the limbs of operators by preventing them from being drawn into the nip.

Commonly owned German Utility Model No. 70 00 740 discloses a guard wherein the support is assembled of several sheet metal profiles and portions of the profiles constitute two elongated strips each adjacent one of the rolls which form the nip. The interior of the support is filled with a foamed hard synthetic plastic material which serves to reduce the likelihood of vibration of the support and of the strips. Each strip is rigid with the support and is deformed with the latter, especially in the middle if the support forms part of a guard for a long nip. The length of a nip can be in the range of up to 10 meters.

A drawback of such guards is that it is very difficult or impossible to maintain each and every portion of each strip at a predeterminied distance from the peripheral surface of the respective roll. The width of clearances between the strips and the rolls is prescribed by the authorities and by the manufacturers. In many countries, the width of clearances between the strips and the respective rolls cannot exceed 8 mm. Adherence to such regulations would present no problems if the deformation of the support for the strips would invariably conform to the deformation of the adjacent rolls. However, the weight of the support causes it to bend, especially midway between its ends, and such bending is independent of and does not match the bending of the rolls which define the nip adjacent the guard. Additional reasons for departure of the width of clearances between the strips and the respective rolls from the prescribed width involve unavoidable manufacturing tolerances, especially as concerns the profiles of the support, as well as distortions of the rolls and/or of the guard as a result of heating or cooling.

Commonly owned German Utility Model No. 1 987 469 discloses a guard which is used in conjunction with takeup reels for webs of paper or other sheet materials. A single elongated strip of the guard is mounted on or forms part of a pivotable lever. The latter can turn about the axis of a guide roll which directs the web against the periphery of the growing supply of convoluted material on the core of the takeup reel. The guard further comprises means for maintaining the strip at a substantially constant distance from the exterior of the growing roll of convoluted sheet material on the takeup reel. The strip is rigid so that each and every portion thereof shares each and every movement of all other portions. The guard which is disclosed in this Utility Model exhibits the same drawbacks as the previously discussed guard, namely it cannot conform with a required degree of accuracy to the adjacent rotary component or components so that the width of the gap between the single strip and the adjacent rotating body is likely to vary with the axial direction of the rotating body. Such an arrangement would be unacceptable as a guard at the inlet side of the nip of a pair of relatively long and heavy rolls in a calender or a like machine.

OBJECTS AND SUMMARY OF THE INVENTION

An object of the invention is to provide a novel and improved guard which can be used with particular advantage in calenders and like machines in order to guard the inlet side of the nip of two elongated rolls against penetration of objects other than the running web which necessitates treatment.

Another object of the invention is to provide a novel and improved support for the strips of the guard.

A further object of the invention is to provide novel and improved strips for use in the above outlined guard.

Still another object of the invention is to provide a guard which can be installed in existing calenders and like machines as a superior substitute for heretofore known guards.

Still another object of the invention is to provide a machine which embodies one or more guards exhibiting the above outlined features and advantages.

A further object of the invention is to provide a guard whose strips can conform to the outlines of the respective rolls irrespective of the extent of deformation of the support and/or irrespective of the extent of deformation of the rolls and/or irrespective of the extent of deviation of deformation of the rolls from deformation of the support.

An additional object of the invention is to provide a simple, compact and inexpensive guard which can be used with advantage in all kinds of calenders and like machines, regardless of the differences of diameters of neighboring rolls defining the nip which must be shielded against penetration of foreign objects.

A further object of the invention is to provide the guard with novel and improved means for changing the position of at least one of the strips relative to the support.

The invention is embodied in a machine for treating a running web of paper, textile material or the like. More particularly, the invention is embodied in a combination of components which are used in such a machine and include first and second elongated rolls defining an elongated nip with an inlet side for admission of the running web and an outlet side, and a novel and improved guard which is installed at the inlet side of the nip. The guard comprises a support, a first substantially strip-shaped elongated blocking device which is mounted on the support adjacent the first roll and extends longitudinally of the nip, and a second substantially strip-shaped elongated blocking device which is mounted on the support adjacent the second roll and also extends longitudinally of the nip. At least one of the blocking devices has a row of sections which extend longitudinally of the respective roll and each of which is movable toward and away from the respective roll independently of at least some of the other sections. The guard further comprises discrete means for moving the sections relative to the respective roll so as to select the distance between the moved sections and the roll. The support preferably extends longitudinally of the nip and has end portions which are mounted in the frame for the bearings of the rolls.

In accordance with a presently preferred embodiment of the invention, the one blocking device is deformable; for example, such blocking device can consist of flexible metallic, plastic or other suitable material. Alternatively, it is possible to assemble the one blocking device of a plurality of sections which are movable relative to each and every other section. In other words, the one blocking device can constitute a one-piece strip or a composite strip with a plurality of flap-like or analogous sections each of which is independently mounted on and is movable relative to the support.

The guard can comprise means for pivotally connecting at least one of the blocking devices to the support. The latter can include a portion (such as a wall) which is adjacent the roll cooperating with the pivotally mounted blocking device, and the connecting means can comprise at least one hinge which is provided on the support at or on the aforementioned wall.

The moving means can include levers which are secured to the sections of the one blocking device, and means for pivoting the levers with the respective sections relative to the support. The support can include a housing with first and second walls which respectively include or constitute first and second portions one of which is adjacent the rolls and the other of which is spaced apart from the nip. The moving means can include motion receiving portions (such as rotary actuators) adjacent that wall or portion of the support which is remote from the rolls, and motion transmitting portions (such as the aforementioned levers) which are operatively connected with the motion receiving portions and are adjacent the first portion or wall of the support. The motion receiving portions are located at a considerable or reasonable distance from the nip. This renders it possible to manipulate the motion receiving means of the moving means at a safe distance from the nip.

At least one of the moving means can comprise an elongated rod having a first threaded portion and serving to move the respective section in response to axial movement of such rod, and an actuator which has a second threaded portion mating with the first threaded portion. The actuator is rotatably mounted on or in the support and serves to move the rod axially in response to its rotation relative to the support. The rod can serve to pivot the aforementioned lever of the respective moving means. The threaded portions are preferably self-locking so that the rod can be moved axially only and alone in response to transmission of torque to the actuator.

The support is preferably hollow, and at least a portion of each moving means can be disposed in the interior of such hollow support.

It is presently preferred to construct the guard in such a way that each of the two blocking devices includes a row of sections, and the guard then comprises discrete means for moving all of the sections.

The diameter of one of the rolls can be greater than or can match the diameter of the other roll.

The machine can further comprise means for moving the entire support with the blocking devices relative to the rolls The novel features which are considered as characteristic of the invention are set forth in particular in the appended claims. The improved guard itself, however, both as to its construction and its mode of operation, together with additional features and advantages thereof, will be best understood upon perusal of the following detailed description of certain specific embodiments with reference to the accompanying drawing.

DESCRIPTION OF PREFERRED EMBODIMENTS

Figure 1:
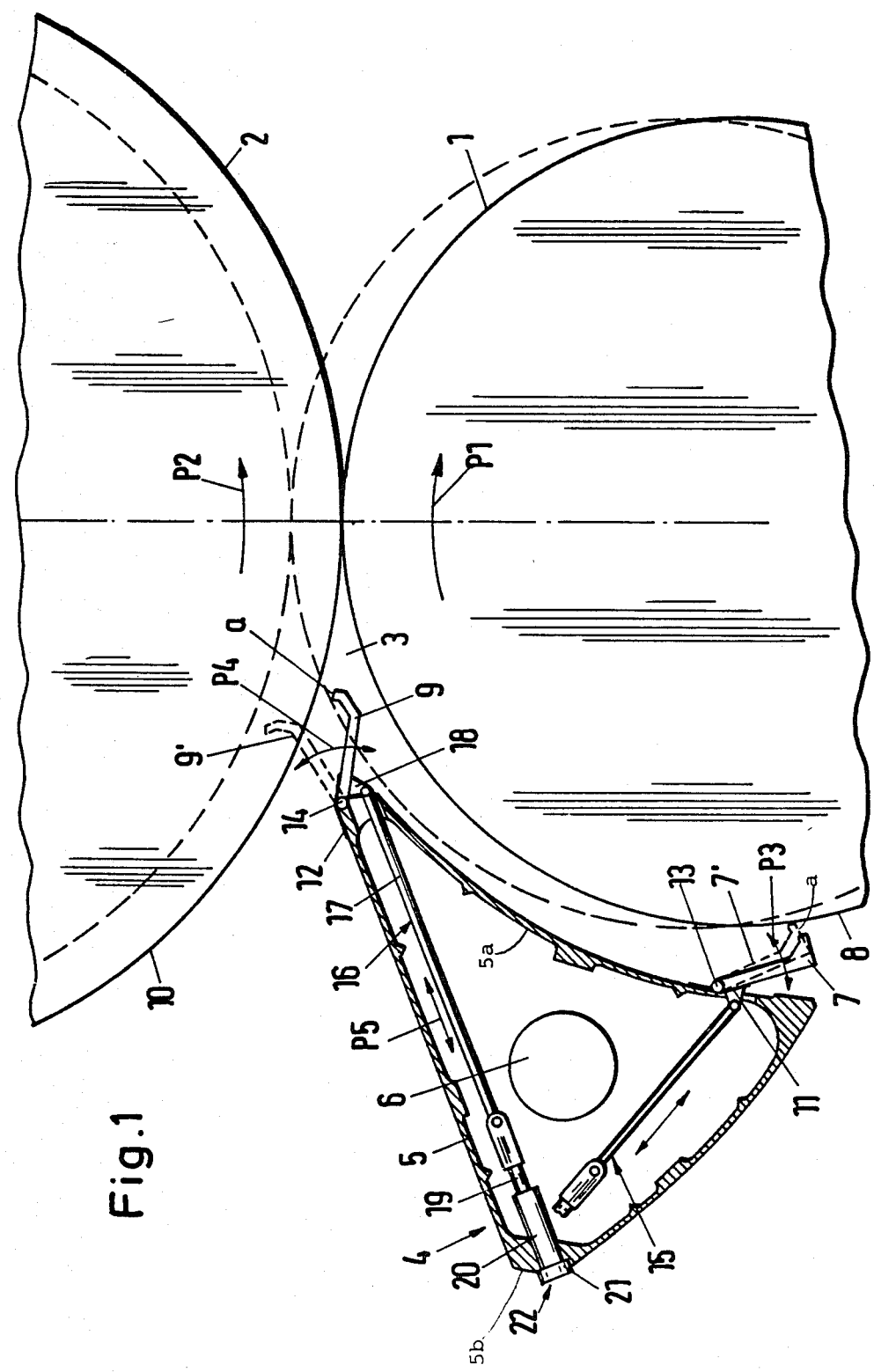
FIG. 1 is an end elevational view of a portion of a calender or an analogous machine for treating running webs of paper or the like wherein the upper roll is larger than the lower roll and the operative positions of the sections of both blocking devices are indicated by solid lines.

Referring first to FIG. 1, there is shown a portion of a calender or a like machine comprising a smaller-diameter lower roll 1 and a larger-diameter upper roll 2. The rolls 1 and 2 define an elongated nip 3 which is adjacent the apex of the lower roll 1 and has an inlet side which is the left-hand side as seen in FIG. 1. This means that a web of material which is delivered, for example by the peripheral surface 8 of the lower roll 1, moves clockwise with the lower roll (see the arrow P1) to enter the inlet side of the nip 3, to be treated in the region of the apex of the roll 1 by the rolls 1 and 2, and to leave the nip at the outlet side. The arrow P2 denotes the direction of rotation of the upper roll 2.

The calender which includes the rolls 1 and 2 further comprises a guard 4 which is adjacent the inlet side of the nip 3 and includes an elongated hollow support 5 and two elongated strip-shaped blocking devices 7 and 9 (hereinafter called strips). The strip 7 should be maintained at not more than a predetermined maximum permissible distance from the peripheral surface 8 of the roll 1, and the strip 9 should be maintained at not more than a predetermined maximum permissible distance from the peripheral surface 10 of the roll 2.

The end portions of the support 5 are mounted in the machine frame which further carries the bearings (not shown) for the rolls 1 and 2. The frame includes a movable portion with shafts 6 (one shown in FIG. 1) for the end portions of the support 5. The shafts 6 are movable in unison relative to the rolls 1 and 2 so as to move the support 5 and its strips 7, 9 to and from the operative positions which are shown in FIG. 1. For example, the entire support 5 will be moved in a direction to the left, as seen in FIG. 1, in order to afford access to the inlet side of the nip 3 when the machine embodying the rolls 1 and 2 is idle. The moving portions of the frame can include a pair of levers (not specifically shown) which carry the respective shafts 6 and are pivotable about a common axis which is parallel to the axes of the rolls 1 and 2 so as to move the support 5 to and from the position which is shown in FIG. 1.

Each of the strips 7, 9 can be made of a deformable material, preferably a flexible plastic material which can exhibit at least some degree of elasticity. Furthermore, each of the strips 7, 9 is pivotally connected to the adjacent portion or wall 5a of the support 5. The connecting means include one or more hinges 11 for the strip 7, and one or more hinges 12 for the strip 9. The hinge or hinges 11 have one or more pintles 13 which define a pivot axis for the strip 7, and the hinge or hinges 12 have one or more pintles 14 which define a pivot axis for the strip 9. The axes of the pintles 13 and 14 are parallel or substantially parallel to the axes of the rolls 1 and 2. The strip 7 is pivotable in directions which are indicated by a double-headed arrow P3, and the strip 9 is pivotable about the axis of the pintle or pintles 14 in directions which are indicate by a double-headed arrow P4.

In addition to, or in lieu of, being deformable (flexible), each of the strips 7 and 9 can be made of a plurality of discrete sections which together form two rows extending parallel to with the longitudinal direction of the nip 3, i.e., parallel to the axes of the respective rolls 1 and 2. FIG. 1 shows at 7' a second section (in addition to that which is shown by solid lines) of the strip 7. The reference character 9' denotes a second section of the strip 9.

The guard 4 further comprises discrete means for moving the sections 7' and 9' of the strips 7 and 9 independently of each other so as to ensure that a person in charge can adjust the width of the clearances a between the tips of the sections of strips 7, 9 and the respective peripheral surfaces 8 and 10. The adjustment can be such that the width of the clearances a will not exceed 8 mm but the respective strips will remain out of contact with the adjacent peripheral surfaces 8, 10 regardless of the extend of sagging or other deformation of the support 5 and/or rolls 1 and 2.

FIG. 1 shows at 15 one of the moving means for the sections 7' of the strip 7, and at 16 one of the moving means for the sections 9' of the strip 9. Since each of the moving means 15 can be identical with each of the moving means 16, FIG. 1 merely shows the details of one of the moving means 16. It will be understood that the illustrated moving means 16 is one of two or more (preferable more than two) moving means each of which can control the inclination of a separate section 9' of the strip 9. The moving means 16 which is shown in FIG. 1 comprises a lever 18 which is rigid with the respective section 9' of the strip 9 and can pivot with such section about the axis of the pintle 14 forming part of the hinge 12. The means for pivoting the lever 18 comprises an elongated rod 17 one end portion of which is articulately connected to the lever 18 and the other end portion of which carries an externally threaded stud 19 the threads of which mate with the internal threads of an actuator 20 in the form of a sleeve which is rotatably journalled in the support 5 at a location remote from the nip 3. The head 21 of the actuator 20 can be engaged by a suitable tool at the locus indicated by the arrow 22 so that it can rotate relative to the support 1 in order to move the rod 17 axially in one of the directions indicated by a double-headed arrow P5 and to thereby pivot the lever 18 and the respective section 9' of the strip 9 with reference to the peripheral surface 10 of the roll 2. It will be noted that the front end of the rod 17 is located in or at the adjacent portion or wall 5a of the support 5, namely in or at a wall which is adjacent the nip 3 and the rolls 1 and 2. On the other hand, the actuator 20 is installed in a portion or wall 5b of the support 5 which is remote from the nip 3. This ensures that a person standing or sitting in front of the machine can manipulate the actuator 20 at a safe distance from the nip 3 and from the web which is running along the peripheral surface 8 of the roll 1 and into the inlet portion of the nip. As shown in FIG. 1, the rod 17 can include two portions one of which is articulately connected with the lever 18 and the other of which is provided with the external thread at 19. The two portions are coupled to each other by a link so that the elongated portion of the rod 17 can change its orientation relative to the externally threaded portion 19. The inclination of external threads of the portion 19 and of internal threads in the actuator 20 is preferably such that each moving means 16 is self-locking, namely that it is necessary to apply torque to the head 21 of the actuator 20 in order to change the axial position of the rod 17 and to thereby pivot the respective section 9' of the strip 9 relative to the peripheral surface 10 of the roll 2. As mentioned above, the construction of each moving means 15 can be identical with that of the illustrated moving means 16.

The moving means 15 and 16 are capable of performing their intended functions regardless of whether or not the respective strips 7 and 9 are assembled of discrete (independently pivotable) sections 7', 9' or the neighboring sections are integral with each other so that the actuation of a selected moving means 15 or 16 will entail a pivoting of the corresponding section 7' or 9' and perhaps a partial pivoting of the adjacent end portions of neighboring sections 7' and 9', respectively.

When the machine embodying the combination of elements which are shown in FIG. 1 is to be put to use, the support 5 is first pivoted or otherwise moved from its retracted position to the position which is shown in FIG. 1 by solid lines. In the next step, the operator or operators manipulate the actuators 20 of the moving devices 15 and 16 (or the actuators of some of such moving devices) in order to ensure that each and every portion of the clearance a between the sections 7' of the strip 7 and the peripheral surface 8 of the roll 1 will not exceed the maximum permissible clearance (such as, for example, 8 mm). Analogously, the width of the clearance a between each section 9' of the strip 9 and the peripheral surface 10 of the roll 2 will be adjusted so as not to exceed the maximum permissible distance before the prime mover for the rolls 1 and 2 is started and a web of textile material, a web of paper or a web of another material which requires treatment is admitted into the nip 3.

The broken lines indicate in FIG. 1 different (raised) positions of the rolls 1 and 2. If the rolls assume such broken-line positions, the moving means 15 and 16 are actuated so as to move all or nearly all sections of the strips 7 and 9 to the positions corresponding to those occupied by the broken-line sections 7' and 9', namely again at no more than the prescribed maximum permissible distance from the peripheral surfaces 8 and 10 of the thus shifted rolls 1 and 2. It has been found that the guard 4 of FIG. 1 renders it possible to invariably select the width of the two clearances a in such a way that the width will not exceed the prescribed maximum permissible width but the sections 7' and 9' of the strips 7 and 9 will remain out of contact with the respective rolls all the way along the nip 3.

Figure 2:
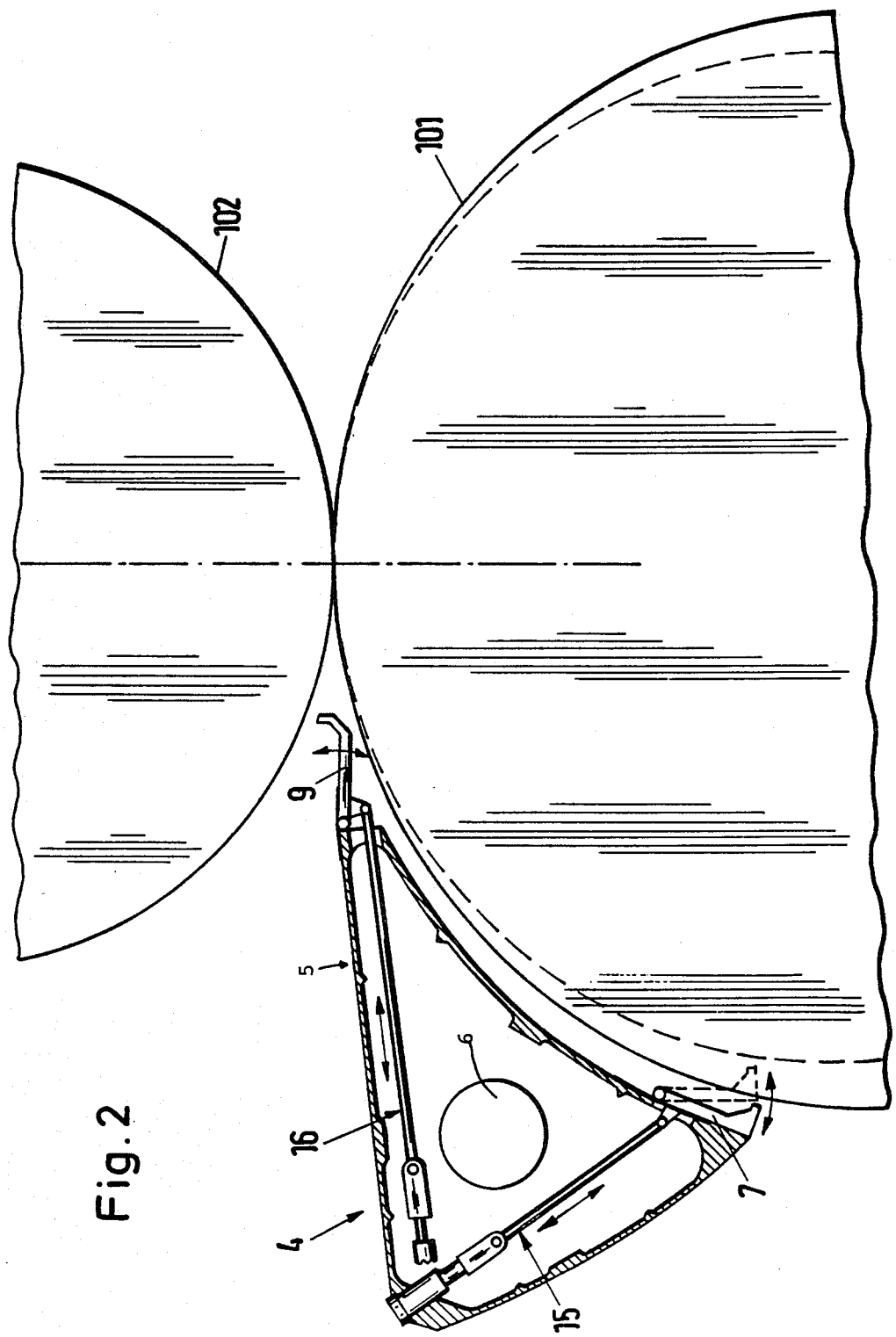
FIG. 2 is a similar end elevational view of a modified machine wherein the upper roll is smaller than the lower roll, the operative positions of the sections of both blocking devices being shown by solid lines.

FIG. 2 shows the guard 4 of FIG. 1 in use with two different rolls 101 and 102. The diameter of the roll 101 exceeds the diameter of the roll 102. FIG. 2 further shows that the diameter of the lower roll 101 can be reduced in response to milling or another suitable treatment which is required from time to time in many types of calenders and like machines. If the diameter of the roll 101 is reduced, the operators simply manipulate the moving means 15 for the sections of the strip 7 so that the section of such strip which is shown by solid lines is moved to the broken-line position of FIG. 2. The directions in which the moving means 15 and 16 can pivot the respective sections of the strips 7 and 9 are indicated by double-headed arrows. The construction of each of the moving means 15 and 16 shown in FIG. 2 can match that of the moving means 16 in FIG. 1.

FIG. 2 further shows that, in order to ensure that the strip 9 is moved sufficiently close to the peripheral surface of the upper roll 102, the entire support 5 of the guard 4 has been pivoted in a counterclockwise direction about the axes of its shafts 6 so as to maintain the strip 7 close to the peripheral surface of the roll 101 and to move the strip 9 sufficiently close to the peripheral surface of the roll 102 so that manipulation of the moving means 16 will suffice to maintain all sections of the strip 9 at a requisite distance from the peripheral surface of the roll 102. In other words, turning of the support 5 about the common axis of the shafts 6 amounts to a coarse adjustment of the strips 7, 9 relative to the respective rolls 101, 102. Precise adjustments of the sections of strips 7 and 9 relative to the peripheral surfaces of the adjacent rolls are then carried out by manipulating the moving means 15 and 16.

The improved guard can be modified in a number of ways without departing from the spirit of the invention. For example, the illustrated carrier 5 (which can constitute an extruded metallic or plastic body) can be replaced by a composite support which is assembled of several profiled pieces of sheet metal or the like. It is also possible to make the support 5 of a foamed plastic material or to fill the interior of the illustrated support 5 with a foamed plastic material in such a way that the introduced plastic material will not interfere with operation of the moving means 15 and 16 in order to change the inclination of the respective sections of the strips 7 and 9. Furthermore, the illustrated moving means 15 and/or 16 can be replaced with gears, eccentrics or any other suitable parts each of which can preferably have an output element or motion transmitting portion in the region of the respective section of the strip 7 or 9 and a motion receiving portion in a region which is remote from the nip.

An important advantage of the improved guard 4 is that its component parts need not be machined or otherwise finished with a very high degree of precision because the movability of sections 7' of the strip 7 and sections 9' of the strip 9 can compensate for machining and assembling tolerances, as well as for differences between the deformation of the support 5 and the deformation of the rolls 1, 2 or 101, 102. Still further, the moving means 15, 16 (or analogous moving means) can compensate for thermal expansion or contraction of the rolls and/or support 5. In face, it is even possible to intentionally reduce the quality of finish and/or the accuracy of making the support 5 in order to achieve savings in initial cost, because such inaccuracies or departures of the shape of the support 5 from an optimum shape can be readily compensated for by pivoting some or all of the sections 7', 9' relative to the adjacent rolls.

Another important advantage of the improved guard is that it can compensate for changes of the diameter of one roll or both rolls, such as are brought about by removal of material at the peripheries of the rolls at certain intervals, depending upon the wear on the rolls and/or the contamination of their peripheral surfaces. All that is necessary upon completion of a milling operation is to adjust some or all of the strip sections 7' and/or 9' upon reintroduction of the freshly treated roll 1, 2, 101 or 102 into the frame of the machine. Adjustments of the shape of the strip 7 and/or 9 can be carried out with little loss in time so that the setting up of the machine for use subsequent to reintroduction of a fresh or freshly treated roll into the machine frame takes up very little time.

As already mentioned above, each of the strips 7, 9 can be made of a flexible material and, in addition, each such strip can comprise a plurality of discrete sections. However, and as also mentioned above, it is possible to properly adjust the width of the clearances a even if the sections of the strip 7 or 9 are coherent sections, as long as the strip is at least slightly flexible so that each of the moving means 15, 16 can change the orientation of the respective section of the strip 7 or 9 regardless of whether such sections are integral with each other or constitute separate flaps or analogous parts which are individually hinged to the support 5. It is further possible to replace the illustrated pivotally mounted strips 7 and 9 with reciprocable strips. The utilization of pivotable strips is preferred at this time because this increases the range of adjustability of the strips relative to the peripheral surfaces of the adjacent rolls. If the strips are pivotable, the pivot axes (defined by the pintles 13 and 14) are preferably closely adjacent the respective rolls, i.e., such pivot axes are preferably adjacent the portion or wall 5a of the support 5.

The actuators 20 are preferably placed at a considerable distance from the nip 3 in order to facilitate manipulation of the moving means 15 and 16 as well as to reduce the likelihood of injury to the operator in charge of selecting the inclination of the sections 7' of the strip 7 and/or the sections 9' of the strip 9.

Though it is equally possible to provide specially designed locking devices in order to hold the moving means 15 and/or 16 against uncontrolled or unintentional displacement, the provision of self-locking threaded connections is preferred at this time because it contributes to simplicity and lower cost of the moving means.

The moving means 15, 16 or similar moving means can be used with equal advantage to transmit motion to reciprocable (rather than pivotable) sections of the strips 7 and 9.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. An apparatus for treating a running web of paper, textile material or the like, comprising first and second elongated rolls defining an elongated nip having an inlet side for admission of the running web and an outlet side; and a guard at the inlet side of said nip, including a support, a first substantially strip-shaped elongated blocking device mounted on said support adjacent said first roll and extending longitudinally of said nip, and a second substantially strip-shaped elongated blocking device mounted on said support adjacent said second roll and extending longitudinally of said nip, at least one of said blocking devices having a plurality of sections arranged in a row extending longitudinally of the respective roll and each being movable toward and away from the respective roll independently of at least some of said sections, said guard further comprising means for moving each of said sections relative to the respective roll independently of at least some of said sections so as to select the distance of the moved sections from the respective roll.

2. The apparatus of claim 1, further comprising a frame for said rolls, said support extending longitudinally of said nip and having end portions mounted in said frame.

3. The apparatus of claim 1, wherein said one blocking device is deformable.

4. The apparatus of claim 3, wherein said one blocking device is flexible.

5. The apparatus of claim 1, wherein each of said sections is movable relative to the respective roll independently of each other section.

6. The apparatus of claim 1, further comprising means for pivotally connecting at least said first blocking device to said support.

7. The apparatus of claim 6, wherein said support includes a wall which is adjacent said first roll, said connecting means comprising at least one hinge in the region of said wall.

8. The apparatus of claim 1, wherein said moving means include levers secured to said sections and means for pivoting said levers with the respective sections relative to said support.

9. The apparatus of claim 1, wherein said support includes first and second portions respectively adjacent to and remote from said blocking devices, said moving means having motion receiving portions adjacent said second portion of said support and motion transmitting portions connected with said sections adjacent the first portion of said support.

10. The apparatus of claim 9, wherein said support includes a housing having first and second walls respectively including said first and second portions.

11. The apparatus of claim 1, wherein at least one of said moving means comprises an elongated rod having a first threaded portion and arranged to move the respective section in response to axial movement thereof, and an acutator having a second threaded portion mating with said first threaded portion, said actuator being rotatably mounted on said support and being arranged to move the rod axially in response to its rotation relative to said support.

12. The apparatus of claim 11, wherein said threaded portions are self-locking so that said rod is movable axially only in response to transmission of torque to said actuator.

13. The apparatus of claim 1, wherein said support is hollow and a portion of each of said moving means is disposed in the interior of said support.

14. The apparatus of claim 1, wherein each of said blocking devices includes a plurality of sections arranged in a row and said guard comprises means for moving each of said sections independently of at least some sections of the respective blocking device.

15. The apparatus of claim 1, wherein the diameter of one of said rolls is greater than that of the other of said rolls.

16. The apparatus of claim 1, further comprising means for moving said support relative to said rolls.

* * * * *